United States Patent
Blessent et al.

(10) Patent No.: US 8,139,518 B2
(45) Date of Patent: Mar. 20, 2012

(54) SYSTEM FOR MEASURING A RISE-OVER-THERMAL CHARACTERISTIC IN A COMMUNICATION NETWORK

(75) Inventors: Luca Blessent, San Marcos, CA (US); Jiangxin Chen, San Diego, CA (US); Farrokh Abrishamkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 634 days.

(21) Appl. No.: 11/179,279

(22) Filed: Jul. 12, 2005

(65) Prior Publication Data
US 2006/0045045 A1  Mar. 2, 2006

Related U.S. Application Data

(60) Provisional application No. 60/606,351, filed on Aug. 31, 2004.

(51) Int. Cl.
H04B 7/185    (2006.01)
H04B 7/00     (2006.01)

(52) U.S. Cl. ........................ 370/318; 455/522

(58) Field of Classification Search .................. 455/453, 455/522, 67.11, 69; 370/318
See application file for complete search history.

(56) References Cited

U.S. PATENT DOCUMENTS

| | | | |
|---|---|---|---|
| 6,192,249 B1 * | 2/2001 | Padovani | 455/453 |
| 6,442,398 B1 | 8/2002 | Padovani et al. | 455/522 |
| 6,591,110 B1 * | 7/2003 | Kim et al. | 455/453 |
| 2001/0008520 A1 * | 7/2001 | Tiedemann et al. | 370/328 |
| 2003/0123401 A1 * | 7/2003 | Dean | 370/318 |
| 2004/0038697 A1 | 2/2004 | Attar et al. | 455/522 |
| 2004/0085934 A1 * | 5/2004 | Balachandran et al. | 370/335 |
| 2004/0121808 A1 | 6/2004 | Hen et al. | 455/561 |
| 2004/0162101 A1 * | 8/2004 | Kim et al. | 455/522 |
| 2004/0192208 A1 * | 9/2004 | Kong et al. | 455/63.1 |

OTHER PUBLICATIONS

International Search Report and Written Opinion—PCT/US2005/031156, International Search Authority—European Patent Office—Jan. 16, 2006.

* cited by examiner

*Primary Examiner* — Lester Kincaid
*Assistant Examiner* — Daniel Lai
(74) *Attorney, Agent, or Firm* — Eric Ho

(57) ABSTRACT

A system for measuring a rise-over-thermal (RoT) characteristic in a communication network includes controlling a transmitting station to maintain its transmit power at a substantially constant level for a first time interval, and measuring a first received power level. The transmitting station is then controlled to adjust its transmit power by a selectable amount for a second time interval, and a second received power level is measured. The first and second received power levels are then processed to determine the RoT characteristic.

20 Claims, 3 Drawing Sheets

SYSTEM FOR MEASURING A RISE-OVER-THERMAL CHARACTERISTIC IN A COMMUNICATION NETWORK

RELATED APPLICATIONS

This application claims priority to U.S. Provisional Application No. 60/606,351, filed Aug. 31, 2004.

BACKGROUND

1. Field

This application relates generally to the operation of communication systems, and more particularly, to a system, method, and computer readable media for measuring a rise-over-thermal characteristic in a communication network.

2. Background Information

Wireless communication networks are currently in widespread use to allow mobile station users to wirelessly communicate with each other and other network entities. In one type of network, multiple stations in a particular geographic region may simultaneously communicate with a hub or base station using the same frequency band. This type of network is referred to as a self-interfering network. A code division multiple access (CDMA) network is an example of a self-interfering network. Thus, the total signal power received by the base station in that frequency band may represent simultaneous transmissions from a number of the stations in the region.

It has become increasingly important for wireless communication networks to provide both data and voice services. Providing data services results in a significant increase in traffic between mobile stations and their associated base stations. For optimal network performance, especially in self-interfering networks, the transmission power of the mobile stations is carefully controlled. It can be seen that a change in transmit power by one station may affect the operation of other mobile stations, for example, requiring them to likewise change their power. In some cases, a network limit may be exceeded if a large number of mobile stations respond to one another by respectively increasing their power. This may cause the network to become unstable. To avoid this from happening, the network load may be balanced, for example, by controlling the transmission power of each mobile station to minimize its impact on other mobile stations and to accommodate for noise power in the network. The noise power is based on environmental factors, such as temperature, which change throughout the day. Thus, any technique that attempts to adjust the network load needs to account for changing noise power in the network.

One technique that is used to adjust the load of a network measures a network characteristic referred to as the rise-over-thermal (RoT). The RoT is a ratio between the total power in the reverse link (Pr) and the thermal noise power (N) that is received at a receiver (i.e., base station). Adjusting the transmission power of the stations to achieve a selected RoT characteristic is one way to balance the network load, and thereby optimize the performance of the network. However, because the noise power changes throughout the day due to environmental factors, the RoT characteristic of the network also changes. Thus, to maintain a selected RoT characteristic, the noise power in the network needs to be measured throughout the day and the transmission power of the stations adjusted accordingly. For example, as the noise power in the network increases, the RoT characteristic changes indicating that the signal power of one or more stations may need to be adjusted to return to the desired RoT characteristic. Thus, obtaining an accurate noise power measurement, and corresponding RoT measurement, is important to optimize the network and thereby provide data and voice services in the most efficient manner.

Unfortunately, conventional techniques that are used to measure RoT characteristics in communication networks have several drawbacks. For example, one technique operates to measure the noise power by disabling transmissions from all the mobile stations communicating with a particular base station, so that the noise power received at the base station can be measured. However, this technique requires interruptions to network services because transmissions from those mobile stations have to be suspended. Furthermore, these interruptions may have to be repeated several times per day in order to get accurate RoT measurements as the noise power in the network changes. Consequently, even if such a technique is utilized in a way that doesn't occur very often and the duration of the silence interval is limited, there may be no standard provisions to enable this silence period in conventional systems, and changing the existing communication standards to allow it may not be backward compatible.

Therefore, what is needed is a system to accurately measure RoT characteristics in a communication network so that the network load may be optimized. Unlike conventional technology, the system should operate to accurately measure RoT characteristics as needed throughout the day without significantly impacting normal network communications while maintaining backward compatibility with existing network standards.

SUMMARY

In one or more embodiments, a rise-over-thermal measurement system, comprising methods and apparatus, is provided to accurately measure a rise-over-thermal characteristic in communication network. For example, the system is suitable for use in a CDMA communication network to accurately measure the RoT characteristic associated with the network's reverse link.

In one embodiment, the system operates to maintain and/or adjust the transmit power levels of mobile stations during multiple time intervals. A base station measures received power levels during those time intervals. The received power levels are then used to compute a noise power (N), and as a result, the RoT characteristic of the network can be determined. The power level adjustments are performed over relatively short time intervals, and do not require the mobile stations to suspend transmissions. Thus, they do not substantially impact the operation of the mobile stations on the network. The system is suitable to make multiple RoT measurements throughout the day without significantly impacting normal network communications. As a result, the measured RoT characteristics can be used to optimize the network's loading.

In one embodiment, a method is provided for measuring a RoT characteristic in a communication network. The method comprises controlling one or more transmitting stations to maintain their transmit power at substantially constant levels for a first time interval, and measuring a first received power level. The method also comprises controlling the one or more transmitting stations to adjust their transmit power by a selectable amount for a second time interval, and measuring a second received power level. The method also comprises processing the first and second received signal power levels to determine the RoT characteristic.

In another embodiment, apparatus is provided for measuring a RoT characteristic in a communication network. The apparatus comprises power control logic that operates to output one or more power control commands to control the transmit power levels of one or more transmitting stations during first and second time intervals. The apparatus also comprises a power detector that operates to detect first and second received power levels during the first and second time intervals, respectively. The apparatus also comprises processing logic that operates to process the first and second received power levels to determine the RoT characteristic.

In still another embodiment, apparatus is provided for measuring a RoT value in a communication network. The apparatus comprises means for controlling one or more transmitting stations to maintain their transmit power at substantially constant levels for a first time interval, and means for measuring a first received power level. The apparatus also comprises means for controlling the one or more transmitting stations to adjust their transmit power by a selectable amount for a second time interval, and means for measuring a second received power level. The apparatus also comprises means for processing the first and second received power levels to determine the RoT characteristic.

In still another embodiment, a computer-readable media is provided that comprises instructions, which when executed by a processor, operate to measure a RoT characteristic in a communication network. The computer-readable media comprises instructions for controlling one or more transmitting stations to maintain their transmit power at substantially constant levels for a first time interval, and instructions for measuring a first received power level. The computer-readable media also comprises instructions for controlling the one or more transmitting stations to adjust their transmit power by a selectable amount for a second time interval, and instructions for measuring a second received power level. The computer-readable media also comprises instructions for processing the first and second received power levels to determine the RoT characteristic.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a rise-over-thermal measurement system for use in a communication network. For example, the system is suitable for use in self-interfering networks to measure the RoT characteristics of a reverse link that is shared by multiple stations to transmit information to a central station, base station, or hub.

Figure 1:
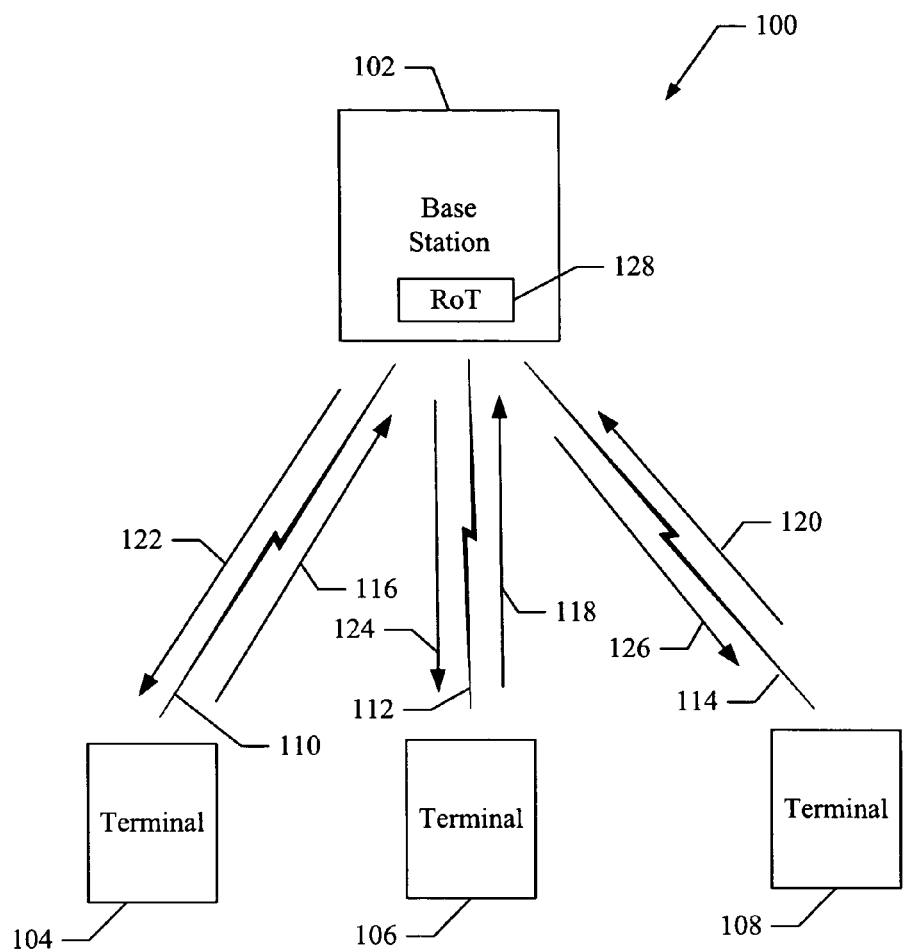
FIG. 1 shows a communication network that includes one embodiment of a RoT measurement system.

FIG. 1 shows a communication network 100 that includes one embodiment of a RoT measurement system. The network 100 comprises a base station 102 that communicates with mobile stations (104, 106, 108) that are in a nearby geographic region. For the purpose of this description, only three mobile stations are shown; however, the system is suitable for use with virtually any number of mobile stations.

The base station 102 communicates with the mobile stations via wireless communication links 110, 112, and 114. The communication links (110, 112, and 114) comprise forward communication channels (not shown), reverse communication channels 116, 118, and 120, and control channels 122, 124, and 126. The mobile stations (104, 106, 108) use the reverse communication channels (116, 118, 120) to transmit information, such as voice or data, to the base station 102. For clarity, the reverse communication channels (116, 118, 120) are referred to collectively as the reverse "link." In one embodiment, the network 100 is self-interfering network where the reverse communication channels (116, 118, 120) utilize the same frequency band and the stations encode their respective transmissions so that they may be decoded at the base station 102. In another embodiment, the network 100 is not self-interfering and the reverse communication channels (116, 118, 120) utilize closely spaced frequency bands that may, however, interfere with each other if transmission powers of the stations are not adequately controlled.

The base station 102 comprises RoT logic 128. The RoT logic 128 operates to perform RoT measurements of the reverse link. In one embodiment, the RoT logic 128 comprises logic to issue power control commands to control the transmit power of the mobile stations. The power control commands are transmitted to the stations via the control channels 122, 124, and 126, respectively, and operate to cause the mobile stations to increase or decrease their transmit power.

Typically, the base station 102 executes a power control loop that operates to control the power transmitted by the mobile stations on the reverse link. In one or more embodiments, the RoT logic 128 operates to briefly overwrite some of the power control commands which are normally generated in order to control a mobile station's transmit power to achieve a desired level, thereby allowing the RoT characteristic of the reverse link to be measured. However, this measurement time is relatively short and the mobile stations still operate to transmit information to the base station 102. Thus, the RoT measurement system may be use throughout the day to measure the RoT characteristic of the reverse link without significantly impacting the operation of the network.

During operation of the RoT measurement system, the RoT logic 128 operates to perform one or more of the following functions to measure the RoT characteristics of the reverse link.

1. Issue power control commands to cause the mobile stations to maintain their respective transmit power levels at a constant level for a first selected first time interval.
2. Measure a first power value of the reverse link.
3. Issue power control commands to cause the mobile stations to increase or decrease their respective transmit power levels by a known amount.
4. Issue power control commands to cause the mobile stations to maintain their new power levels for a second selected time interval.
5. Measure a second power value of the reverse link.
6. Process the first and second power values to determine a noise power level.
7. Utilize the determined noise power level to computer the RoT characteristic of the reverse link.

Embodiments of the above system operate to determine the RoT and associated noise power of the network without requiring any of the mobile stations to suspend transmissions. Thus, the system is able to make measurements of the RoT characteristics of the network throughout the day as the noise power changes. Once a RoT characteristic is determined, the base station may issue additional power control commands to adjust the transmit powers of one or more stations to maintain a desired RoT characteristic.

Figure 2:
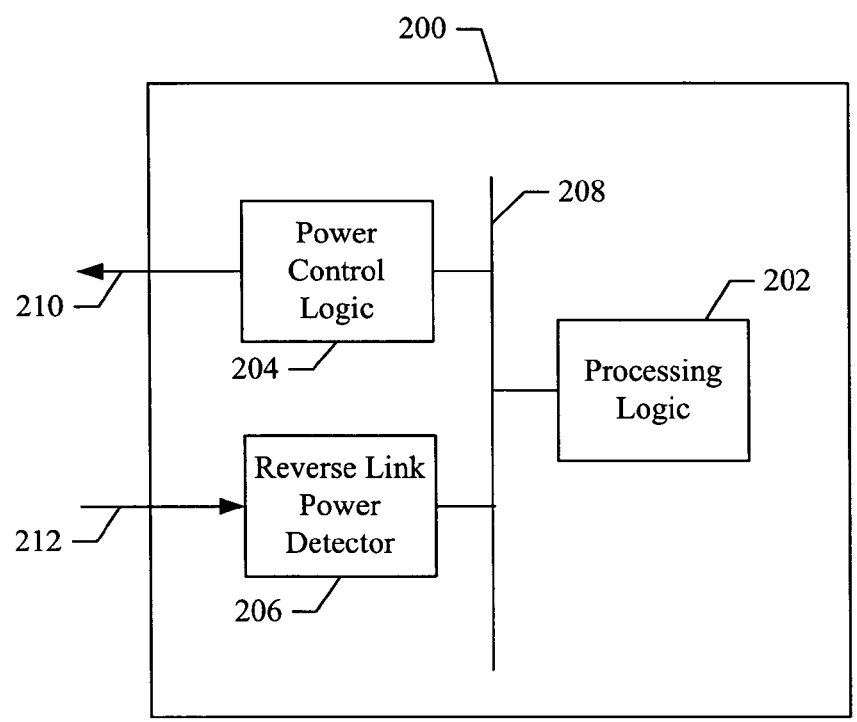
FIG. 2 shows a diagram of one embodiment of RoT measurement logic.

FIG. 2 shows a diagram of one embodiment of rise-over-thermal measurement logic 200. For example, the logic 200 is suitable for use as the RoT logic 128 shown in FIG. 1. The RoT logic 200 comprises processing logic 202, power control logic 204, and a reverse link power detector 206, all coupled to an internal data bus 208.

The reverse link power detector 206 comprises a processor, CPU, gate array, logic, discrete circuitry, software, and/or any combination of hardware and software. The detector 206 operates to detect a received power level of signals received over a reverse link of a communication network, such as the network 100. Thus, the detector 206 comprises logic to detect a received power level of signals received over the reverse link 216. The detector 206 uses any suitable power detection technique and/or logic to detect or measure the received signal power received over the reverse link 216.

The power control logic 204 comprises a processor, CPU, gate array, logic, discrete circuitry, software, and/or any combination of hardware and software. The control logic 204 operates to generate power control commands that are transmitted via a control channel 214 to control the transmit power of one or more mobile stations. For example, the control channel 214 may be the control channels 122, 124, 124 shown in FIG. 1 that operate to control the transmit power of the stations 104, 106 and 108, respectively. During normal operation of the network, a power control loop is executed that controls the transmit power of the stations. In one or more embodiments, the RoT measurement system operates to briefly overwrite some of the power control commands so that the ROT characteristic can be measured. However, normal operation of the mobile stations remains generally unaffected since the stations are still able to transmit signals and the commands of the power control loop are only overwritten for a short period of time.

In one embodiment, the power control commands comprise a power increase command and a power decrease command. The power increase command causes a selected mobile station to increase its transmit power by a selectable amount, or "step size." The power decrease command causes a selected mobile station to decrease its transmit power by a selectable amount, or step size. In one embodiment, the selectable amount (step size) and is equal to one dB. However, any suitable step size may be used.

In another embodiment, the power control commands comprise any suitable type of command that may be used to control the power of one or more mobile stations. Furthermore, the power control commands may be provided to the mobile stations using any type of transmission channel or technique. For example, the commands may be stored in a computer program that is executed by the mobile stations.

The processing logic 202 comprises a processor, CPU, gate array, logic, discreet circuitry, software, and/or any combination of hardware and software. In one embodiment, the processing logic 202 operates to control the operation of the power control logic 204 and the reverse link power detector 206 to measure a RoT characteristic of the reverse link 212. For example, the processing logic 202 controls the power control logic 204 to transmit selected power control commands to one or more mobile stations on the network. The processing logic 202 then controls the reverse link power detector 206 to detect the power of signals received over the reverse link 212.

The processing logic 202 also comprises timing logic (not shown) that operates to measure one or more time intervals during which power detection on the reverse link 212 is performed. For example, the timing logic operates to time the first and second time intervals as described with reference to FIG. 1.

During operation of one embodiment, the power control logic 204 outputs power control commands to the mobile stations to maintain their respective transmit powers constant for a first time interval. For example, the power control logic 204 outputs alternating power increase and power decrease commands. The detector 206 then detects a first power level ($P_1$) of the reverse link 212. The power control logic 204 then outputs power control commands to cause the mobile stations to increase or decrease their respective transmit powers by a known amount, and then maintain the new levels constant for a second time interval. The detector 206 then detects a second power level ($P_2$) of the reverse link 212. Once the two power levels ($P_1$ and $P_2$) are detected, the processing logic 202 operates to determine a noise power (N) associated with the network given the existing environmental factors. The processing logic 202 then utilizes the determined noise power (N) to computer the RoT characteristic of the reverse link 212.

In one embodiment, the processing logic 202 operates to determine the RoT characteristic of the reverse link 212 by analyzing the following two linear equations to determine the noise power (N).

$$P_1 = N + S$$

$$P_2 = N + (\alpha * S)$$

where $P_1$ is the total received power in the first time interval, $P_2$ is the total received power in the second time interval, N is the noise component of the received power, S is the total received signal power, and $\alpha$ is the adjustment factor to the signal power. It should be noted that the values for N and S will be substantially the same during the two time intervals because the two time intervals are close together, and so the environmental factors associated with the network will not have substantially changed. It should also be noted that the measurements made during the two time intervals might comprise an average of multiple measurements made during each interval. The adjustment factor $\alpha$ indicates how much the transmit powers of the stations have been increased or decreased during the second time interval. For example, the transmit powers of the stations may be increased by 2-3 dB. During each measurement, the length of the first measurement interval may be 10 ms and the length of the second measurement interval may be 10 ms. The adjustment factor alpha can be set to 3 dB, for example. To further increase the reliability, multiple measurements can be performed. It is recommended that the final result be obtained after averaging 10 measurements. The consecutive measurements should be separated by at least 2 seconds to ensure that the quality of the reverse link is not significantly impacted by the measurements."

Once the processing logic 202 determines the noise power (N) from the above equations, the power control loop that is used to control the transmit power of the stations is returned to its normal state. The RoT characteristic of the network is the determined from the following equation;

$$RoT = P_r / N$$

where $P_r$ is the total power received at the base station on the reverse link, and N is the noise power determined from the above equations. The overall process and/or equations may be repeated one or more times to produce an average RoT result. Thus, the system operates to determine a RoT characteristic of the reverse link without having to know how many stations are actively transmitting on the network. In one or more embodiments, the system operates to compute an accurate estimate of the noise power. Once the noise power is known, the RoT characteristic can be computed as often as required, for instance every 5 or 10 ms. Additionally, the noise power may be recomputed throughout the day as environmental conditions change.

In one embodiment, the RoT measurement system comprises program instructions stored on a computer-readable media, which when executed by the rise-over-thermal measurement logic 200, provides the functions as described herein. For example, instructions may be loaded into the processing logic 202 from a computer-readable media, such as a floppy disk, CDROM, memory card, FLASH memory device, RAM, ROM, or any other type of memory device or computer-readable media that interfaces to the processing logic 202. In another embodiment, the instructions may be downloaded into the processing logic 202 from a network resource. The instructions, when executed by the processing logic 202, provide one or more embodiments of a RoT measurement system as described herein.

It should be understood that the elements of the rise-over-thermal measurement logic 200 shown in FIG. 2 represent just one embodiment, and that implementation of the measurement logic 200 could be achieved in one of any number of ways using greater or fewer functional elements. For example, some or all of the function elements shown could be implemented in hardware or in a computer program executed by one or more processors.

Figure 3:
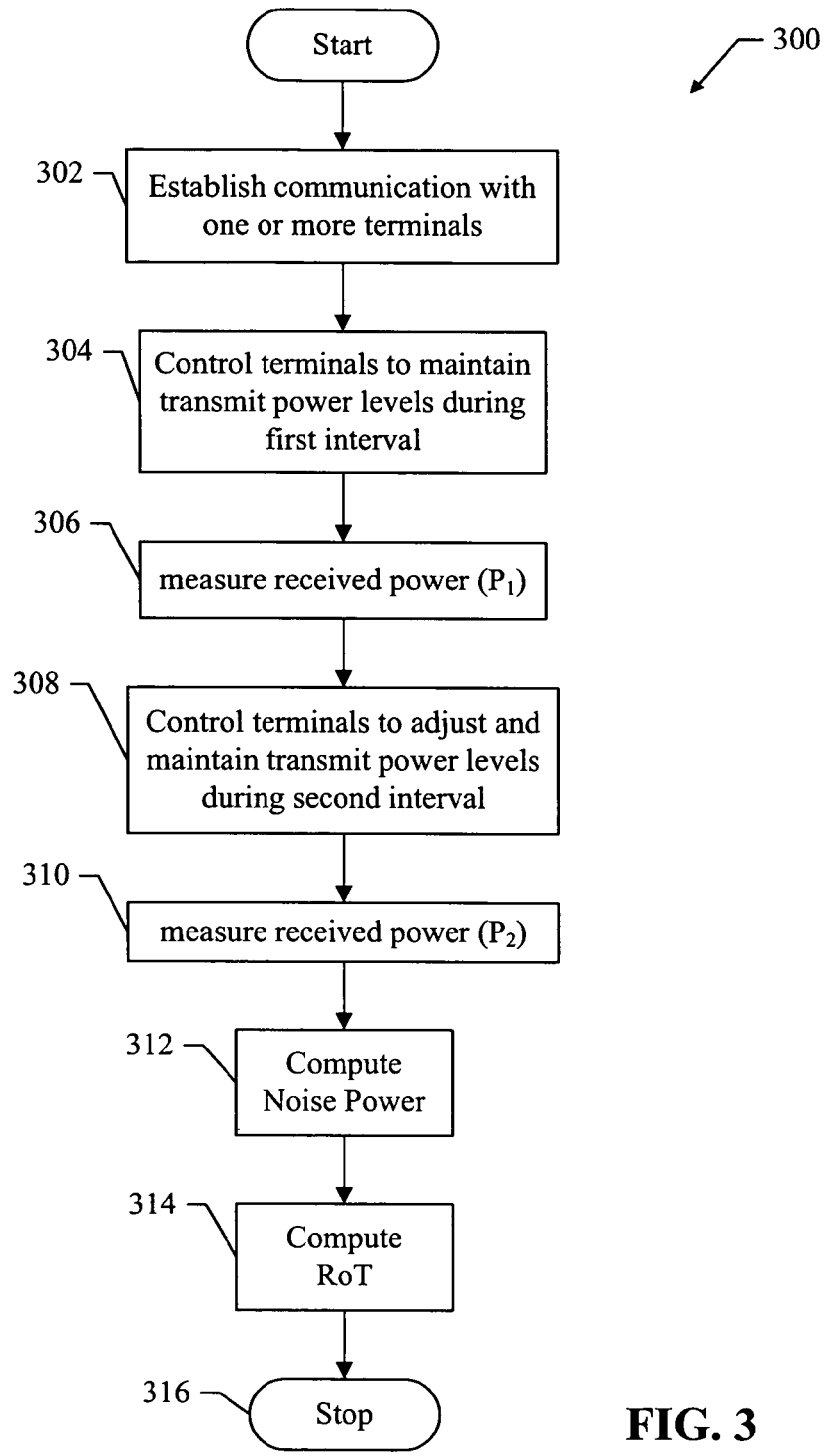
FIG. 3 shows one embodiment of a method for measuring RoT in a communication network.

FIG. 3 shows one embodiment of a method 300 for determining a RoT characteristic of a communication channel in a wireless data network. The method 300 is suitable for use by one or more embodiments of the RoT measurement logic 200 shown in FIG. 2.

At block 302, network communications with several mobile stations are established where the mobile station communicate over a reverse link. For example, the network may be a CDMA network where one or more mobile stations communicate with a base station over a reverse link.

At block 304, the transmit power of the mobile stations in maintained at a fixed level for a first selectable time interval. For example, in one embodiment, the processing logic 202 operates to control the power control logic 204 to output alternating power increase and power decrease commands to the mobile stations via the control channel 210. The alternating power control commands have the effect over the first time interval of maintaining the transmit power of the mobile stations at a fixed level.

At block 306, the received power on the reverse link is measured. For example, the processing logic 202 controls the reverses link power detector 206 to measure the received power ($P_1$) on the reverse link 212. The detected level ($P_1$) is stored for later processing.

At block 308, the transmit power of the mobile stations is adjusted and maintained at a new transmit power level during a second selectable time interval. For example, in one embodiment, the processing logic 202 operates to control the power control logic 204 to output a selectable number of power increase or power decrease commands to the mobile stations via the control channel 210. The selectable number of power increase or power decrease commands cause the mobile stations to adjust their transmit powers by a known amount. For example, if the step size of each power control command is one dB, then four increase power commands will cause the mobile stations to increase their transmit power by four db. The power control logic 204 then outputs power control commands to cause the mobile stations to maintain their new power levels for a second selectable time interval. For example, alternating power increase and power decrease commands are transmitted.

At block 310, the received power on the reverse link is measured. For example, the processing logic 202 controls the reverses link power detector 206 to measure the received power ($P_2$) on the reverse link 212. The detected level ($P_2$) is stored for later processing. The processing logic 202 then operates to return the power control loop operating at the base station to it normal operation.

At block 312, a noise power value is computed from the measured power values ($P_1$ and $P_2$). For example, in one embodiment, the processing logic 202 operates to compute the noise power value by solving for (N) in the two linear equations described above.

At block 314, an RoT characteristic is computed from the measured noise power value (N) and total received power value ($P_r$). For example, in one embodiment, the processing logic 202 operates to measure the total received power ($P_r$) received at the base station by controlling the reverse link power detector 206. Once the received power ($P_r$) is measured, the RoT characteristic of the reverse link can be computed as described above. The processing logic 202 may then control the power control logic 204 to transmit power control commands to one or more mobile stations to set the load of the network to a desired level. The method then ends at block 316.

It should be noted that the method 300 is just one embodiment and that changes, additions, deletions, or rearrange of the method 300 is within the scope of the described embodiments.

A rise-over-thermal measurement system for measuring a rise-over-thermal characteristic in a communication network has been described. Accordingly, while one or more embodiments of the rise-over-thermal measurement system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A method for measuring a rise-over-thermal characteristic in a communication network, the method being implemented by a base station, the method comprising:

transmitting power increase and power decrease commands to at least one transmitting station during a first time interval in order to control the at least one transmitting station to maintain its average transmit power at a first substantially constant level for the first time interval;

measuring a first power level received during the first time interval;

transmitting, after the first time interval and before a second time interval, power control commands to cause the at least one transmitting station to adjust their respective transmit power levels by a known amount;

transmitting power increase and power decrease commands to the at least one transmitting station during the second time interval in order to control the at least one transmitting station to maintain its average transmit power at a second substantially constant level for the second time interval, wherein the second substantially constant level is different than the first substantially constant level, and wherein transmissions from the at least one transmitting station are not suspended during the first time interval or the second time interval;

measuring a second power level received during the second time interval; and processing the first and second received power levels to determine the rise-over-thermal characteristic.

2. The method of claim 1, wherein transmitting power increase and power decrease commands comprises transmitting alternating power increase and power decrease commands.

3. The method of claim 1 wherein said processing comprises solving two linear equations to determine a noise power (N), wherein the two linear equations comprise two unknowns, and wherein the two linear equations both depend on total received signal power.

4. The method of claim 3, wherein the two linear equations are:

$$P_1 = N+S; \text{ and}$$

$$P_2 = N+(\alpha * S),$$

in which,
P$_1$ is said first power level received during the first time interval;
P$_2$ is said second power level received during the second time interval;
S is said total received signal power; and
α is said selectable amount of power adjustment.

5. The method of claim 4 wherein the step of processing comprises determining the rise-over-thermal (RoT) characteristic from $$RoT = P_r/N$$

in which:
P$_r$ is total received power on a reverse link.

6. An apparatus for measuring a rise-over-thermal (RoT) characteristic in a communication network, comprising:
power control logic to transmit power increase and power decrease commands to at least one transmitting station during a first time interval in order to control the at least one transmitting station to maintain its average transmit power at a first substantially constant level for the first time interval, to transmit, after the first time interval and before a second time interval, power control commands to cause the at least one transmitting station to adjust their respective transmit power levels by a known amount, and to transmit power increase and power decrease commands to the at least one transmitting station during the second time interval in order to control the at least one transmitting station to maintain its average transmit power at a second substantially constant level for the second time interval, wherein the second substantially constant level is different than the first substantially constant level, and wherein transmissions from the at least one transmitting station are not suspended during the first time interval or the second time interval;
a power detector to detect first and second received power levels during the first and second time intervals, respectively; and
processing logic to process the first and second received power levels to determine the RoT characteristic.

7. The apparatus of claim 6, wherein transmitting power increase and power decrease commands comprises transmitting alternating power increase and power decrease commands.

8. The apparatus of claim 6, wherein the processing logic comprises logic to solve two linear equations to determine a noise power (N), wherein the two linear equations comprise two unknowns, and wherein the two linear equations both depend on total received signal power.

9. The apparatus of claim 8, wherein the two linear equations are:

$$P_1 = N+S; \text{ and}$$

$$P_2 = N+(\alpha * S),$$

in which,
P$_1$ is said first power level received during the first time interval;
P$_2$ is said second power level received during the second time interval;
S is said total received signal power; and
α is said selectable amount of power adjustment.

10. The apparatus of claim 9 wherein the processing logic further comprises logic to determine the RoT characteristic from $$RoT = P_r/N$$

in which:
P$_r$ is total received power on a reverse link.

11. An apparatus for measuring a rise-over-thermal (RoT) value in a communication network, comprising:
means for transmitting power increase and power decrease commands to at least one transmitting station during a first time interval in order to control the at least one transmitting station to maintain its average transmit power at a first substantially constant level for the first time interval;
means for measuring a first power level received during the first time interval;
means for transmitting, after the first time interval and before a second time interval, power control commands to cause the at least one transmitting station to adjust their respective transmit power levels by a known amount;
means for transmitting power increase and power decrease commands to the at least one transmitting station during the second time interval in order to control the at least one transmitting station to maintain its average transmit power at a second substantially constant level for the second time interval, wherein the second substantially constant level is different than the first substantially constant level, and wherein transmissions from the at least one transmitting station are not suspended during the first time interval or the second time interval;
means for measuring a second power level received during the second time interval; and
means for processing the first and second received power levels to determine the RoT characteristic.

12. The apparatus of claim 11, wherein transmitting power increase and power decrease commands comprises transmitting alternating power increase and power decrease commands.

13. The apparatus of claim 11 wherein the means for processing comprises means for solving two linear equations to determine a noise power (N), wherein the two linear equations comprise two unknowns, and wherein the two linear equations both depend on total received signal power.

14. The apparatus of claim 13, wherein the two linear equations are:

$$P_1 = N+S; \text{ and}$$

$$P_2 = N+(\alpha * S)$$

in which, $P_1$ is said first power level received during the first time interval;

$P_2$ is said second power level received during the second time interval;

S is said total received signal power; and

α is said selectable amount of power adjustment.

15. The apparatus of claim 14 wherein the means for processing further comprises means for determining the RoT characteristic from $$RoT = P_r/N$$

in which:

$P_r$ is total received power on a reverse link.

16. A non-transitory computer-readable media comprising instructions, which when executed by a processor, operate to measure a rise-over-thermal (RoT) characteristic in a communication network, comprising:

instructions for transmitting power increase and power decrease commands to at least one transmitting station during a first time interval in order to control the at least one transmitting station to maintain its average transmit power at a first substantially constant level for the first time interval;

instructions for measuring a first power level received during the first time interval;

instructions for transmitting, after the first time interval and before a second time interval, power control commands to cause the at least one transmitting station to adjust their respective transmit power levels by a known amount;

instructions for transmitting power increase and power decrease commands to the at least one transmitting station during the second time interval in order to control the at least one transmitting station to maintain its average transmit power at a second substantially constant level for the second time interval, wherein the second substantially constant level is different than the first substantially constant level, and wherein transmissions from the at least one transmitting station are not suspended during the first time interval or the second time interval;

instructions for measuring a second power level received during the second time interval; and instructions for processing the first and second received power levels to determine the RoT characteristic.

17. The computer-readable media of claim 16, wherein transmitting power increase and power decrease commands comprises transmitting alternating power increase and power decrease commands.

18. The computer-readable media of claim 16, wherein the instructions for processing comprise instructions for solving two linear equations to determine a noise power (N), wherein the two linear equations comprise two unknowns, and wherein the two linear equations both depend on total received signal power.

19. The computer-readable media of claim 18, wherein the two linear equations are:

$$P_1 = N + S; \text{ and}$$

$$P_2 = N + (\alpha * S)$$

in which, $P_1$ is said first power level received during the first time interval;

$P_2$ is said second power level received during the second time interval;

S is said total received signal power; and

α is said selectable amount of power adjustment.

20. The computer-readable media of claim 19 wherein the instructions for processing further comprise instructions for determining the RoT characteristic from $$RoT = P_r/N$$

in which:

$P_r$ is total received power on a reverse link.

* * * * *